United States Patent [19]

Christen

[11] Patent Number: 4,527,902
[45] Date of Patent: Jul. 9, 1985

[54] METHODS AND MIXERS FOR THE CONTINUOUS ADDITION OF GLUE TO MIXTURES CONSISTING OF WOOD CHIPS, WOOD FIBRES OR THE LIKE

[75] Inventor: Werner Christen, Mannheim, Fed. Rep. of Germany

[73] Assignee: Draiswerke GmbH, Mannheim, Fed. Rep. of Germany

[21] Appl. No.: 575,812

[22] Filed: Mar. 1, 1984

[30] Foreign Application Priority Data

Feb. 8, 1983 [DE] Fed. Rep. of Germany ....... 3304129

[51] Int. Cl.³ .............................................. B01F 5/04
[52] U.S. Cl. .................................... 366/169; 366/147
[58] Field of Search .............. 366/169, 170, 168, 167, 366/150, 151, 152, 160, 161, 162, 76, 144, 147

[56] References Cited

U.S. PATENT DOCUMENTS

| | | | |
|---|---|---|---|
| 3,163,403 | 12/1964 | Engels | 366/168 |
| 3,734,471 | 5/1973 | Engels | 366/173 |
| 4,006,887 | 2/1977 | Engels | 366/165 |
| 4,015,829 | 4/1977 | Forster | 366/169 |
| 4,143,975 | 3/1979 | Lodige | 366/169 |
| 4,183,676 | 1/1980 | Engels et al. | 366/181 |
| 4,390,285 | 6/1983 | Durr et al. | 366/168 |
| 4,390,822 | 6/1983 | Wechsler | 366/76 |

FOREIGN PATENT DOCUMENTS 7112402 7/1971 Fed. Rep. of Germany .
2134305 1/1973 Fed. Rep. of Germany .

*Primary Examiner*—Robert W. Jenkins
*Attorney, Agent, or Firm*—Laff, Whitesel, Conte & Saret

[57] ABSTRACT

In a method for the continuous addition of glue to a mixture consisting of wood chips, wood fibres or the like, the mixture is moved helically, in the form of a ring of mixture, through at least one glue-applying zone of a mixing container where glue is supplied to the mixture substantially radially from the inside of the ring of mixture.

In order to achieve a particularly satisfactory distribution of glue over the chips or fibres with the use of little energy and so little destruction of the chips, the glue is very finely atomized in the space situated inside the ring of mixture and is supplied to the ring of mixture largely radially. For this purpose, glue nozzles, to which glue can be supplied under pressure by a glue proportioning pump, are mounted on the shaft of the mixing container.

14 Claims, 7 Drawing Figures

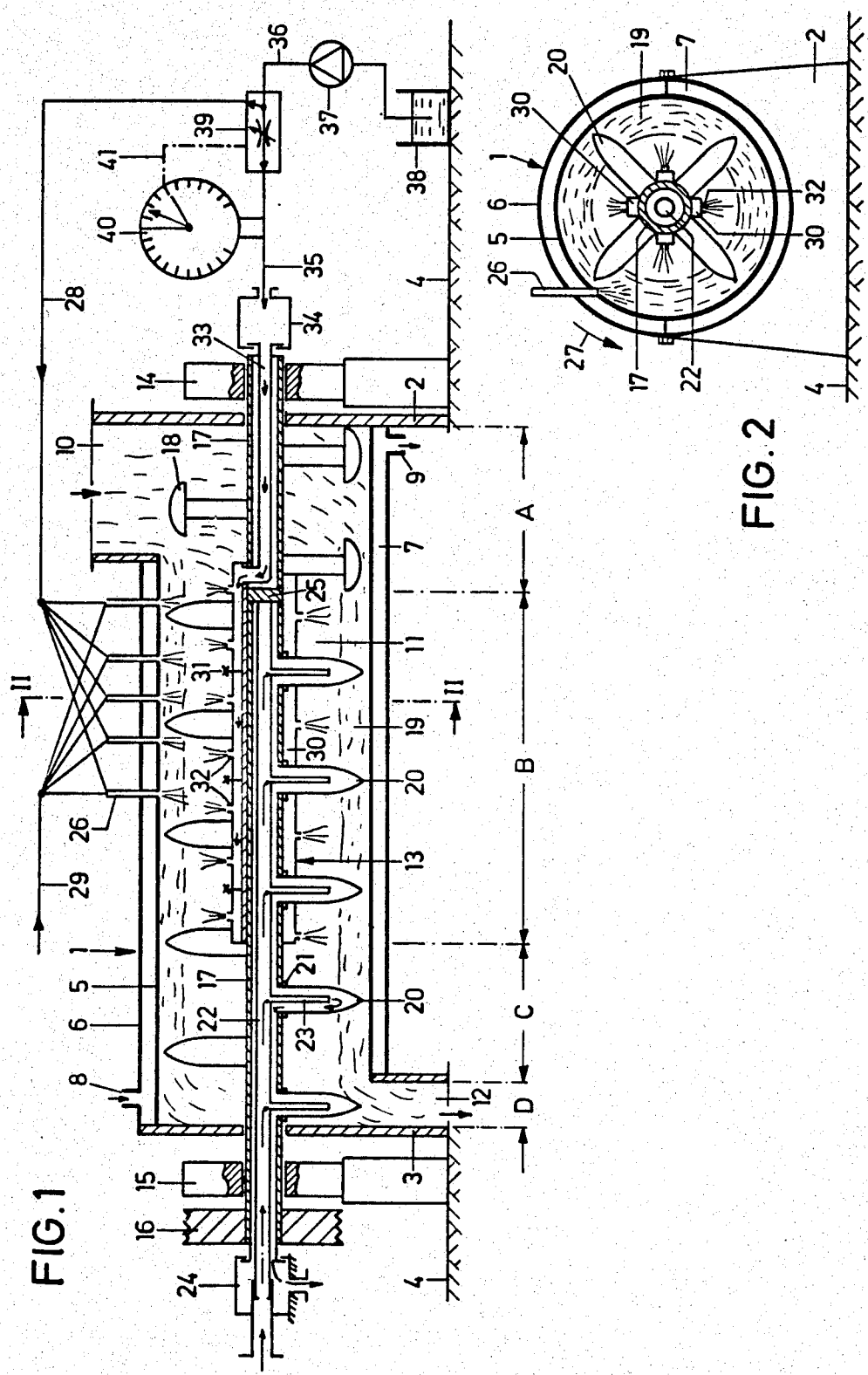

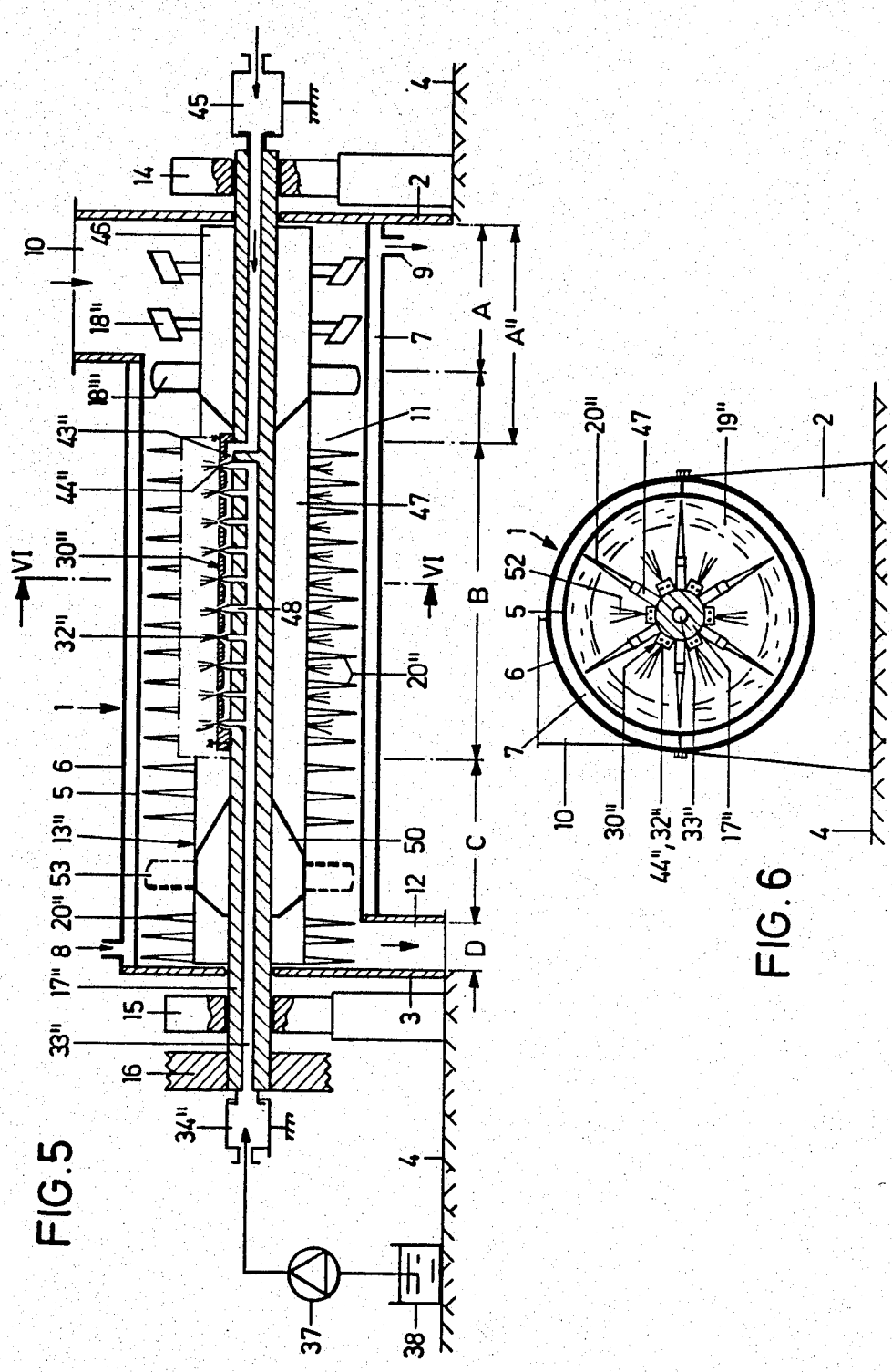

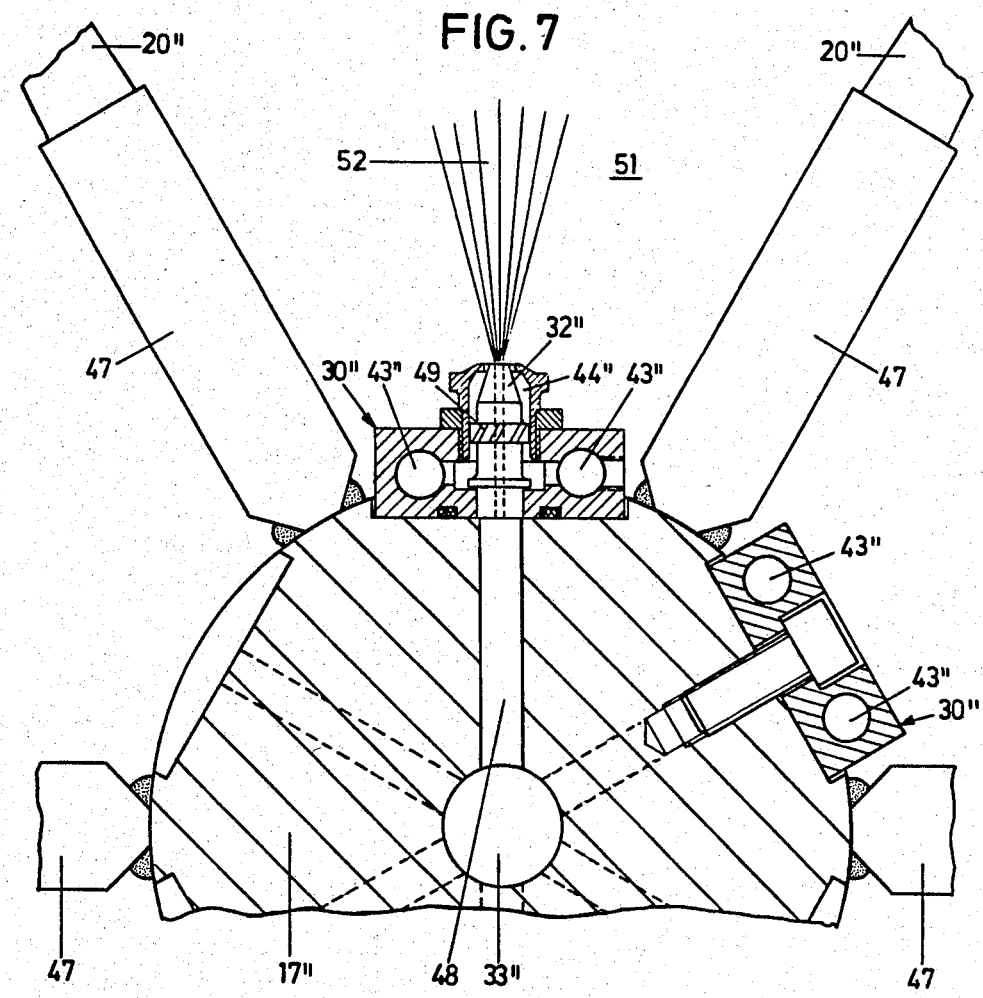

4,527,902

METHODS AND MIXERS FOR THE CONTINUOUS ADDITION OF GLUE TO MIXTURES CONSISTING OF WOOD CHIPS, WOOD FIBRES OR THE LIKE

BACKGROUND OF THE INVENTION

This invention relates to a method for the continuous addition of glue to a mixture consisting of wood chips, wood fibres or the like and to a mixer for carrying out this method.

A method and a mixer of the type above-mentioned are known from the U.S. Pat. No. 3,734,471 in which small centrifugal glue tubes are mounted on a shaft which tubes end in the ring of mixture and to which the glue is supplied without pressure through the shaft which is of hollow construction. In this case, the distribution of the glue over the chips is effected predominantly by a so-called wiping effect, that is to say the chips travelling past the openings of the centrifugal glue tubes wipe off glue which is further distributed over the surfaces of the chips in an after-mixing zone and is also transferred to other chips. These mixers have proved extremely successful in practice but suffer from the disadvantage that the distribution of the glue was effected with a very high introduction of energy which led, on the one hand to a partial destruction of the coarse chips which are important for the strength of chipboards, and on the other hand to a considerable use of energy.

From German Auslegeschrift No. 2134305, it is known to supply the glue, largely without pressure, through small glue tubes which are taken into the mixing container from the outside and end in the ring of mixture. As a result of this construction, cleaning of the glue supply tubes is facilitated, in particular, with substantially the same effect.

From German Gebrauchsmuster No. 7112402, it is known, in a ring mixer, to deliver the glue through small centrifugal glue tubes, projecting radially from the shaft, into the space situated inside the ring of mixture. A satisfactory distribution of the glue over the chips is not possible by this means; instead the risk of glue and spots of glue breaking through is very great. For this reason, in this known mixer, it was additionally provided to provide also small glue feed tubes projecting into the mixing container from the outside and ending with their outlets in the ring of mixture, in order to achieve a more or less satisfactory distribution of glue over the individual chip fractions. Apart from this, the problems of high introduction of energy and destruction of chips caused thereby also occur in this mixer.

From U.S. Pat. No. 4,390,285, it is known to introduce the glue into the ring of mixture from the outside through glue-air nozzles disposed substantially flush with the container wall.

Finally, from U.S. Pat. No. 3,163,403, it is known to introduce plasticizers into plastics materials for the production of a so-called dry blend, in such a manner that the plasticizer is supplied through the shaft of a mixer and is introduced, through nozzles, into the interior space inside a ring of mixture consisting of plastics particles. The working of the plasticizer into the plastics and not on its surface is effected by the required high introduction of energy by means of the mixing mechanism. In this case problems of destruction of the particles by the excessive introduction of energy do not arise.

SUMMARY OF THE INVENTION

It is the object of the invention to develop a method and a mixer of the type above-mentioned so that an even better distribution of glue is achieved over the chips or fibres with the use of little energy and hence little destruction of chips.

According to one aspect of the invention, this problem is solved by a method for the continuous addition of glue to a mixture consisting of wood chips, wood fibres or the like, in which the mixture is moved helically, in the form of a ring of mixture, through at least one glue-applying zone in which glue is supplied substantially radially to the mixture from the inside of the ring of mixture, wherein the glue is very finely atomized in the space situated inside the ring of mixture and is supplied largely radially to the ring of mixture.

The present invention also provides a mixer for carrying out this method, said mixer comprising a substantially cylindrical mixing container having an inner wall, an inlet pipe leading into one end of said container, an outlet pipe leading from the other end of the container, a hollow shaft concentrically located in said container and provided with mixing tools extending radially to close to the inner wall of said mixing container, means for rotating said shaft at high speed and means for supplying and distributing glue in said container, wherein said glue supplying means comprise a glue proportioning pump adapted to supply glue under pressure to the interior of said shaft and said glue distributing means comprise glue nozzles mounted on said shaft.

As a result of the satisfactory preliminary distribution of the glue, a subsequent distribution of the glue by wiping effects between the individual particles is largely unnecessary. For this reason, the necessary introduction of energy into the mixture is less. This leads to a saving of energy and to a reduced destruction of chips. The expenditure on apparatus is also reduced because the after-mixing zone which follows on the glue-applying zone and in which the distribution of the glue over the individual chips or fibres or the transfer of glue between individual particles is effected, can be shortened. As a result of the possible reduction in the speed of rotation and the reduced introduction of energy, the wear of the parts coming into contact with the chips or fibres is also less, from which an increase in the life of the mixer results.

Very fine atomization of the glue can be achieved by means of compressed air. However, the glue may, if desired, be atomized at the same constant pressure in which case compressed-air atomization is not necessary since, as a result of the fact that the pressure of the glue is kept constant even over considerable fluctuations in throughput, the atomization of the glue is always constant. Since mixers for adding glue to chips and fibres are operated with very different amounts of throughput per unit of time, according to the operating conditions, assurance is thus provided that the glue is constantly finely atomized.

In a preferred method according to the invention, a basic amount of glue is supplied to the ring of mixture from the inside and an excess amount of glue is introduced directly into the ring of mixture from the outside. As a result of this measure, the effect is achieved that the supply of excess glue from the outside directly into the ring of mixture leads to a better distribution of glue over the individual chip fractions forming in the ring of mixture.

The excess amount of glue can also be very finely atomized by means of compressed air so that, in the case of this too, the supply of glue from the inside and outside is effected predominantly by so-called spray application of glue and not wiping application of glue.

In the mixer according to the invention, the glue nozzles are desirably arranged on glue bars which are secured to the shaft. The mounting of the glue bars mounted on the outside of the shaft renders possible a constructional multiplicity with simplicity from the manufacturing point of view and, in particular, renders it possible to adapt mixers to particular operating conditions or operating requirements in a simple manner without altering the basic construction.

The glue bars may take the form of glue-air nozzles which are arranged to be acted on by compressed air. The glue bars may further take the form of a glue passage and/or an air passage. The shaft is desirably provided with cooling means in the region of the glue bars.

In a mixer for adding glue to fibres according to a preferred embodiment of the invention mixing tools are mounted on ventilating bars which are mounted on the shaft and the glue bars are located between the ventilating bars whereby glue issuing from the said glue nozles is sheltered from turbulence.

The glue nozzles are desirably preceded by a device for maintaining the glue pressure constant. Alternatively or in addition, the glue nozzles may be preceded by a quantity apportioning or quantity regulating valve and glue-air nozzles leading into the mixing container from outside may be provided for an excess amount of glue. The valve is desirably controllable to deliver a constant glue pressure.

BRIEF DESCRIPTION OF THE DRAWINGS

The invention will now be further described, by way of example, with reference to the drawings, in which:

FIG. 1 shows one embodiment of a mixer according to the invention provided primarily for the addition of glue to chips, in a vertical axial longitudinal section;

FIG. 2 is a cross-section through the mixer taken on the section line II—II in FIG. 1 in the direction of the arrows;

FIG. 5 shows a third embodiment of a mixer according to the invention provided primarily for the addition of glue to fibres, in vertical axial longitudinal section;

FIG. 6 is a cross-section through the mixer shown in FIG. 5 taken on the section line VI—VI in FIG. 5 in the direction of the arrows; and FIG. 7 shows a partial detail from FIG. 6 on a greatly enlarged scale.

In the drawings, like parts are denoted by like reference numerals.

DESCRIPTION OF PREFERRED EMBODIMENTS

Figures 3, 4:
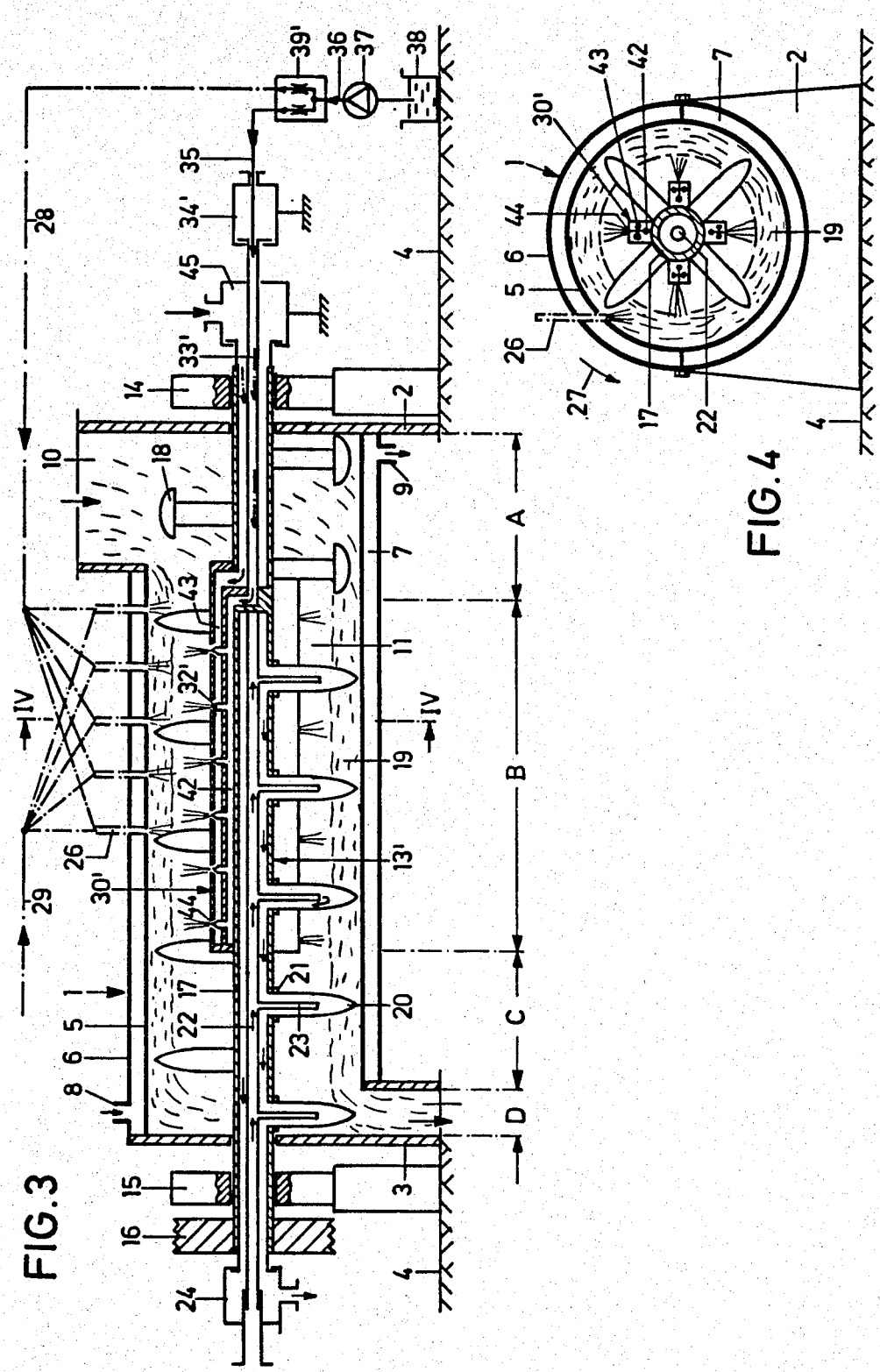
FIG. 3 shows a second embodiment of a mixer according to the invention likewise provided for the addition of glue to chips, in vertical axial longitudinal section.
FIG. 4 is a cross-section through the mixer shown in FIG. 3 taken on the section line IV—IV in FIG. 3 in the direction of the arrows.

The mixers illustrated in the drawings comprise a cylindrical mixing container 1 which is disposed horizontally and which is closed at the ends by means of end plates 2, 3, which are each supported in relation to a bed 4. The mixing container is of double-walled construction, that is to say it comprises a cylindrical inner wall 5 and an outer wall 6 surrounding this concentrically with spacing, a cooling passage 7 being formed between the inner wall 5 and the outer wall 6, to which cooling passage cooling medium is supplied through an inlet 8 and is drawn off through an outlet 9.

At one end—the right-hand end in FIGS. 1, 3, 5—an inlet pipe 10 leads tangentially from above into the mixing container 1, and through it wood chips, wood fibres or the like, to which glue is to be added, can be introduced into the mixing compartment 11 of the mixer. At the other end of the mixing container, an outlet pipe 12 is provided which likewise leads out tangentially and through which the chips or fibres or the like are delivered after their treatment with glue.

Disposed concentrically in the mixing container 1 in each case is a mixing-unit shaft 13, 13′ or 13″ respectively, which extends through corresponding openings in the end plates 2, 3 and is mounted in bearings 14, 15. Drive to the mixing-unit shaft 13, 13′, 13″ is effected by a motor (not shown) via a belt driven and a belt pulley 16 secured to the mixing-unit shaft 13, 13′, 13″. This basic construction of the mixer is generally known and is widespread in practice.

In the forms of embodiment shown in FIGS. 1 to 4, which are primarily equipped for adding glue to wood chips, the mixing-unit shaft 13 or 13′ comprises a tubular, that is to say hollow, shaft 17 on which so-called draw-in tools 18 are mounted which project radially in the region of the inlet pipe 10 and through which the material fed in through the inlet pipe 10 is accelerated tangentially and axially with respect to the mixing container 1, in a draw-in zone A, so that the material moves in the form of a ring 19 of mixture bearing against the inner wall 5 and moving helically towards the outlet pipe 12, in a following glue-applying zone B and an after-mixing zone C following thereon. In the glue-applying zone B and the after-mixing zone C and possibly a discharge zone D associated with the outlet pipe 12, the shaft 17 is provided with mixing tools 20 which become narrower towards the outside and which likewise project radially from the shaft 17. The mixing tools 20 are of hollow construction and are each screwed into a corresponding threaded sleeve 21 which is mounted on the shaft 17.

In the region of these mixing tools 20, a cooling-water supply pipe 22 extends into the shaft 17, from which supply pipe respective distributor pipes 23 project into each of the hollow mixing tools 20. The cooling water is supplied to the supply pipe 22 via an ordinary commercial pipe union 24 through which the cooling water is also drawn off again. This pipe union 24 is held against rotation, that is to say it is rotatable in relation to the shaft 17 and to the cooling-water supply pipe 22. The cooling water flows through the supply pipe 22 and is conveyed, via the distributor pipes 23, into the mixing tools 20 from where it flows back, along their inside, into the shaft 17 and flows back through this shaft in the annular space formed between the inner wall of the shaft and the supply pipe 22. The region of the shaft 17 carrying the cooling water is closed by a partition 25. The mixing tools 20 may be constructed as illustrated and described in U.S. Pat. Nos. 4,183,676 and 3,734,471.

In the glue-applying zone B, some glue-air nozzles 26 are disposed axially one behind the other, which nozzles lead approximately tangentially into the mixing compartment 11 in the direction of rotation 27 of the mixing-unit shaft 13 or 13′, and end with their outlets in the ring 19 of mixture. Glue is supplied to these glue-air nozzles 26 via a glue branch pipe 28 and compressed air is supplied to them through a compressed-air line 29 so that the glue atomized by means of the compressed air is blown finely divided out of the nozzles 26 into the ring 19 of mixture.

In the embodiment shown in FIGS. 1 and 2, glue bars 30, which are of hollow construction, are secured to the shaft 17 by means of screws 31 in the glue-applying zone B between the radially projecting mixing tools 20. Glue nozzles 32 lead out of the glue bars 30 and spray glue into the space inside the ring 19 of mixture. Glue is supplied to the glue bars 30 through a glue pipe 33 which is disposed concentrically in the shaft 17 and extends through this in the draw-in zone A and which is provided at the input end which is located outside the end of the shaft 17 with a pipe union 34 to which the glue is in turn supplied through a glue pipe 35.

The supply of glue to the glue pipe 35 and to the glue branch pipe 28 is effected via a main glue pipe 36 and a glue proportioning pump 37 from a glue storage container 38. The control of the proportioning pump 37 is effected in the usual manner depending on the amount of chips or the like which are supplied to the mixer per unit of time. The distribution of the glue delivered by the proportioning pump 37 to the branch pipe 28 and the glue pipe 35 is effected by means of an ordinary commerical quantity-regulating or quantity-apportioning valve 39 in that, by keeping the pressure of the glue pipe 35 and hence of the glue nozzles 32 constant, substantially the same amount of glue is always supplied, while only the excess amount of glue, the amount of which per unit of time depends on the throughput of the mixer, is supplied to the glue branch pipe 28 and hence to the glue-air nozzles 26. Disposed in the glue pipe 35 is a pressure gauge 40 which may be used additionally to control the valve 39 as indicated by a connecting pipe 41 shown in chain line.

In the embodiment shown in FIGS. 3 and 4, not only glue but also glue and air are distributed via glue bars 30' mounted on the shaft 17. For this purpose, glue is supplied to the glue bars 30' through a glue pipe 33' disposed concentrically in the shaft 17 and is distributed over a corresponding glue passage 42 in each glue bar 30'. Leading out of this glue passage 42 are glue nozzles 32' which extend through an air passage 43 located radially outside the glue passage 42. The ends of the glue nozzles 32' lie in air nozzles 44 so that glue and air emerge simultaneously from the glue bars 30', with fine atomization or dispersion of the glue. Compressed air is supplied to the air passage 43 through the space in the shaft 17 concentrically surrounding the glue pipe 33'. In order to reduce this simultaneous supply possible, two pipe unions are provided. One pipe union 34' is connected to the glue pipe 33' for the supply of glue. A further pipe union 45 is connected to the shaft 17 and serves to supply the compressed air into the shaft 17. Since, in the embodiment shown in FIGS. 3 and 4, the glue is atomized from the mixing-unit shaft 13' by means of two-component nozzles, namely by means of glue-air nozzles 32', 44, it is not absolutely necessary to supply the glue supplied via the shaft 17 at a constant pressure. For this reason, the proportion of the total amount of glue supplied via the glue bars 30' may fluctuate within a considerable range, that is to say even the whole amount of glue may be supplied via the glue bars 30'. In some circumstances, therefore, the glue supply via the glue-air nozzles 26 mounted on the mixing container 1 can be dispensed with. An ordinary commercial quantity-apportioning valve 39', which does not have to be controllable for the reasons given, serves to divide the total amount of glue into two component streams.

In both of the embodiments shown in FIGS. 1, 2 and 3, 4, the shaft 17 is cooled in the glue-applying zone B, that is to say in the region which extends over the glue bars 30 and 30'.

The embodiment shown in FIGS. 5 and 6 is designed primarily for adding glue to fibres and comprises an uncooled mixing-unit shaft 13''. A cylinder portion 46, extending radially and axially, is mounted on the shaft 17'' in the draw-in zone A. Mounted on the cylinder portion 46 are draw-in tools 18'' by means of which fibres fed in through the inlet pipe 10 are accelerated in the direction of rotation, that is to say tangentially to the mixing container 1, and axially. If—as may happen in practice—there are no defined air suction conditions behind the outlet pipe 12, it may be advisable to mount propeller-like draw-in tools 18''' behind the inlet pipe 10, on the portion 46, which tools produce a slightly reduced pressure in the draw-in zone A and in the inlet pipe 10 and in the preceding area and which also ensure a better conveying of the fibres through the mixing compartment 11 of the mixing container 1. In this case, the draw-in zone A is extended to the length A''.

In the glue-applying zone B, radially projecting ventilation bars 47 are mounted on the shaft, on which bars there are rod-shaped mixing tools 20'' which become narrower towards the outside. The ventilation bars 47 with mixing tools 20'' also extend over the after-mixing zone C, and the radial extent of the ventilation bars 47 and the mixing tools 20'' can be altered, being appropriately adapted to the diameter of the mixing compartment 11. The construction of such ventilation bars 47 with the mixing tools 20'' is known and is described, for example, in the U.S. Pat. No. 4,006,887.

Screwed onto the shaft 17'' between the ventilation bars 47 are glue bars 30'' to which glue is supplied through a glue pipe 33'' which may be formed by a bore in the shaft 17''. Here, too, the supply is effected via a pipe union 34'' but—as distinct from the embodiments shown in FIGS. 1 to 4—from the side at which the outlet pipe 12 is situated because in this embodiment the mixing-unit shaft 13'' is not cooled. From the glue pipe 33'', the glue is supplied radially to glue nozzles 32'' which extend through the glue bars 30''. The supply is effected through radial bores 48 in the shaft 17''. A respective air passage 43'' is provided in each of the glue bars 30'' and compressed air is supplied to the air passages 43'' through the interior of the shaft 17'' to which a pipe union 45 is connected. From the air passages 43'', the compressed air is supplied to air nozzles 44'' which surround the glue nozzles 32'' concentrically. Mounted on the outer circumference of the glue nozzles 32'' in each case are swirl devices 49 through which a swirl is imparted to the air flowing out through the associated air nozzles 44'', which contributes to a particularly fine atomization of the glue.

As can be seen in particular from FIGS. 6 and 7, the radial extent of the ventilation bars 47 is very much greater than the radial extent of the glue bars 30''. The radial extent of the ventilation bars 47 corresponds substantially to that of the cylinder portion 46. Immediately in front of the discharge zone D, a concentrating section 50 is mounted on the shaft 17'', the outer circumference of which likewise corresponds substantially to the radial extent of the ventilation bars 47. As can be seen from FIG. 5, the cylinder portion 46 and the concentrating section 50 each become narrower substantially in the form of a frustum of a cone towards the shaft 17''. As a result of the construction described above, the regions 51 between adjacent ventilation bars 47 are free of radial, tangential and axial air flows or turbulence. Thus spray cones 52 of glue and air can develop largely without disturbance.

The glue which is very finely divided on the one hand and is moving at a high radial velocity on the other hand, penetrates over a large area and deep into the ring 19'' of mixture and is deposited, already finely divided, on the fibres. Further distribution is effected by the spike-like mixing tools 20''. With this addition of glue to fibres, as a result of the ventilation bars 47, the ring 19'' of mixture is not as dense as in the embodiments shown in FIGS. 1 to 4. Instead, a very much greater turbulence of the air occurs which also leads to a loosening up of the ring 19'' of mixture.

Fundamentally, the ventilation bars 47 with the mixing tools 20'' also extend into the discharge zone D. For the same reasons for which additional propeller-like draw-in tools 18''' may be provided in front of the glue-applying zone B, propeller-like discharge tools 53 may also be provided at the end of the after-mixing zone C, which tools also produce a slightly reduced pressure in the glue-applying zone B. Since these discharge tools 53 are only provided in the special circumstances described, they are only illustrated in broken lines. They are disposed on the concentrating section 50.

The mixing-unit shafts 13, 13', 13'' are driven at high speed, at a speed of rotation which is far overcritical, namely at about 20 to 40 times the critical speed. The critical speed is defined as the speed at which acceleration due to gravity acts on the radially outer ends of the mixing tools. The ring of mixture 19 or 19'' rotates at about half the peripheral speed of the ends of the mixing tools. The dimensioning of the mixing tools and the density of their distribution on the mixing-unit shaft 13, 13', 13'' is effected so that these last-mentioned conditions prevail.

As indicated in FIGS. 2, 4 and 6, the mixing containers 1 are divided in their horizontal central plane in the usual manner.

The invention is not restricted to the above-described embodiments but modifications and variations may be made without departing from the spirit and scope of the invention as defined by the appended claims.

What is claimed is:

1. A method for the continuous addition of glue to a mixture consisting of wood chips, wood fibres or the like, in which the mixture is moved helically, in the form of a ring of mixture, through at least one glue-applying zone in which glue is supplied substantially radially to the mixture from the inside of the ring of mixture, wherein the glue is very finely atomized in the space situated inside the ring of mixture and is supplied largely radially to the ring of mixture.

2. A method as claimed in claim 1, in which the glue is very finely atomized by means of compressed air.

3. A method as claimed in claim 1, in which the glue is atomized with the same constant pressure.

4. A method as claimed in claim 1, in which a basic amount of glue is supplied to the ring of mixture from the inside and an excess amount of glue is introduced directly into the ring of mixture from the outside.

5. A method as claimed in claim 4, in which said excess amount of glue is very finely atomized by means of compressed air.

6. A mixer for carrying out the method claimed in claim 1, said mixer comprising a substantially cylindrical mixing container having an inner wall, an inlet pipe leading into one end of said container, an outlet pipe leading from the other end of the container, a hollow shaft concentrically located in said container and provided with mixing tools extending radially to close to the inner wall of said mixing container, means for rotating said shaft at high speed and means for supplying and distributing glue in said container, wherein said glue supplying means comprise a glue proportioning pump adapted to supply glue under pressure to the interior of said shaft and said glue distributing means comprise glue nozzles arranged on glue bars which are secured to said shaft.

7. A mixer as claimed in claim 6, in which said glue bars comprise glue-air nozzles which are arranged to be acted on by compressed air.

8. A mixer as claimed in claim 6, in which said glue bars comprise a glue passage.

9. A mixer as claimed in claim 6, in which said glue bars comprise a glue passage and an air passage.

10. A mixer as claimed in claim 6, in which the shaft is provided with cooling means in the region of said glue bars.

11. A mixer for adding glue to fibres as claimed in claim 7, in which mixing tools are mounted on ventilating bars which are mounted on said shaft and in which said glue bars are located between said ventilating bars whereby glue issuing from said glue nozzles is sheltered from turbulence.

12. A mixer as claimed in claim 6, in which said glue nozzles are preceded by a device for maintaining the glue pressure constant.

13. A mixer as claimed in claim 6, in which said glue nozzles are preceded by a quantity apportioning valve and in which glue-air nozzles leading into the mixing container from the outside are provided for an excess amount of glue.

14. A mixer as claimed in claim 13, in which said valve is controllable to deliver a constant glue pressure.

* * * * *

UNITED STATES PATENT AND TRADEMARK OFFICE
CERTIFICATE OF CORRECTION

PATENT NO. : 4,527,902
DATED : July 9, 1985
INVENTOR(S) : WERNER CHRISTEN

It is certified that error appears in the above—identified patent and that said Letters Patent is hereby corrected as shown below:

On the title page:

Filing date is shown as Mar. 1, 1984 -- correct date is February 1, 1984.

Signed and Sealed this

Third Day of December 1985

[SEAL]

Attest:

DONALD J. QUIGG

Attesting Officer   Commissioner of Patents and Trademarks